(12) United States Patent
Halpern

(10) Patent No.: US 6,792,597 B1
(45) Date of Patent: Sep. 14, 2004

(54) AUTOMATIC CONSISTENCY CHECKING OF COMPUTER PROGRAMS

(75) Inventor: Mordechai Halpern, Cambridge, MA (US)

(73) Assignee: Wysdom Wireless, Inc., Boston, MA (US)

(*) Notice: Subject to any disclaimer, the term of this patent is extended or adjusted under 35 U.S.C. 154(b) by 0 days.

(21) Appl. No.: 09/519,506

(22) Filed: Mar. 6, 2000

Related U.S. Application Data

(60) Provisional application No. 60/122,830, filed on Mar. 4, 1999.

(51) Int. Cl.[7] .................................................. G06F 9/45
(52) U.S. Cl. .................................................... 717/126
(58) Field of Search ......................................... 717/126

(56) References Cited

U.S. PATENT DOCUMENTS

| | | | | |
|---|---|---|---|---|
| 4,315,315 A | * | 2/1982 | Kossiakoff | 717/109 |
| 5,167,012 A | * | 11/1992 | Hayes et al. | 706/60 |
| 5,485,615 A | * | 1/1996 | Wennmyr | 717/109 |
| 5,507,030 A | * | 4/1996 | Sites | 717/136 |
| 5,664,189 A | * | 9/1997 | Wilcox et al. | 707/205 |
| 5,842,204 A | * | 11/1998 | Andrews et al. | 707/3 |
| 5,923,880 A | * | 7/1999 | Rose et al. | 717/145 |
| 5,931,909 A | * | 8/1999 | Taylor | 709/221 |
| 6,317,871 B1 | * | 11/2001 | Andrews et al. | 717/137 |
| 2002/0092010 A1 | * | 7/2002 | Fiske | 717/168 |

FOREIGN PATENT DOCUMENTS

EP  WO-9814895  *  4/1998  ........... G06F/17/30

OTHER PUBLICATIONS

Wolf et al., Intervals in Software Execution Cost Analysis, ACM, 2000, p. 1–6.*

Hodges et al., A system for Automatic Software Evaluation, ACM, Oct. 1976, p. 617–623.*

* cited by examiner

Primary Examiner—John Chavis
(74) Attorney, Agent, or Firm—Bromberg & Sunstein LLP

(57) ABSTRACT

A method and apparatus for structuring a program segment are disclosed. The method for structuring a program segment on a computer begins with the step of identifying a series of program blocks in the segment. Each block is a functional piece of code in the segment and has at least one point corresponding to at least one of entry and exit, in such a manner that the entire segment is divided into blocks with each block being situated in an execution path along which the segment executes in a downstream direction. With respect to each block, a block representative is associated for allocating computer memory for data elements that are needed for the associated block to execute. The block representative assigns a value to any data element required by the associated block to have a value. The block representative also calls the associated block for execution, receives return of control after execution of the block, and passes control based on available data.

16 Claims, 16 Drawing Sheets

AUTOMATIC CONSISTENCY CHECKING OF COMPUTER PROGRAMS

This application claims priority from co-pending U.S. Provisional Application No. 60/122,830, filed Mar. 4, 1999, the full disclosure of which is hereby incorporated by reference herein.

TECHNICAL FIELD

The present invention relates to computer programming and more specifically to systems for checking computer programs.

BACKGROUND ART

Currently, program development is generally accomplished within a programming environment which contains multiple development tools. One example of a programming environment is the Visual C++ programming environment as distributed by the Microsoft Corporation, Redmond, Wash. A programmer may use the environment to create a workspace which links together multiple files of a program, to compile the program using the environment's compiler, and to debug the program using the environment's debugger. Even though these tools exist, the programer must keep track of the various connections between variables, classes, procedures and structures within the code and identify any discrepancies to have the program execute. Typically, the tracking must be done manually without the assistance of the development environment.

Even if a program is executable and is executed on a computer, the program still may not function correctly. In order to determine whether a program is producing correct internal results and a correct final output, the programmer must keep track of the flow of data between various components of the code for the program and analyze the results. If a function passes a variable to another process within the program and the variable does not contain an acceptable value, the end data may be faulty. The programmer must then determine where the error is located and what caused the error. A modification by a programmer to a single variable may affect multiple and disjointed lines of code producing errors that may be difficult to trace manually. Additionally, if the programmer chooses to move or change an element of code, the programmer must again manually track the relationships that are changed throughout the program by the modification.

SUMMARY OF THE INVENTION

The present invention solves the problems of the prior art by providing a method and apparatus for structuring a program segment. In a first embodiment of the method for use with a computer having memory, for structuring a program segment, the method begins with the step of identifying a series of program blocks in the segment. Each block is a functional piece of code in the segment and has at least one point corresponding to at least one of entry and exit, in such a manner that the entire segment is divided into blocks with each block being situated in an execution path along which the segment executes in a downstream direction. With respect to each block, a block representative is associated for allocating computer memory for data elements that are needed for the associated block to execute. The block representative assigns a value to any data element required by the associated block to have a value. The block representative also calls the associated block for execution, receives return of control after execution of the block, and passes control based on available data. In another embodiment of the method, a block of interest is treated as a sub-segment. In the sub-segment a series of program sub-blocks are identified in the block. Each sub-block is a functional piece of code in the block and has at least one point corresponding to at least one of entry and exit, in such a manner that the entire block is divided into sub-blocks with each sub-block being situated in an execution path along which the block executes in a downstream direction. With respect to each sub-block, a sub-block representative is associated with the sub-block. The sub-block representative allocates computer memory for data elements that are needed for the associated sub-block to execute. The sub-block representative assigns a value to any data element required by the associated sub-block to have a value. The sub-block representative calls the associated sub-block for execution, receives return of control after execution of the sub-block, and passes control based on available data.

In another embodiment of the method, the block representative includes a virtual page, where the virtual page is a virtual entry page when associated with an entry point and the virtual page performs the functions of allocating computer memory for data elements that are needed for the associated sub-block to execute, assigning a value to any data element required by the associated sub-block to have a value and calling the associated sub-block for execution of the block representative. The virtual page is a virtual exit page when associated with an exit point and the virtual page performs the functions of receiving return of control after execution of the sub-block, and passing control based on available data.

In yet another embodiment of the method, the block representative also validates all data elements that are assigned values by the associated block. In the step of assigning a value to any data element required by the associated block to have a value, the step includes evaluating expressions that depend on data elements created by upstream block representatives.

In still yet another embodiment of the method, in the step of passing control based on available data, the step includes executing a decision to identify a downstream block to be executed next by evaluating an expression that depends on data elements created by an upstream block representative or by the associated block itself.

In another embodiment, of the method for each given virtual entry page, all data elements are identified, from upstream virtual pages, on which the data elements of the given virtual entry page are logically dependent. Any upstream pages containing such data elements are considered ancestor pages. Any given entry page may lie in any number of execution paths and each data element of the given entry page is expressed as a function of one or more data elements occurring in one or more ancestor pages along any of the execution paths.

In a further embodiment of the method, for each virtual entry page, the method includes the step of determining with respect to each data element appearing in any of the expressions whether such data element has been created in an upstream virtual page. The method may also include the step of identifying inconsistent virtual entry pages. Pages are identified as inconsistent if the page includes a data element that is logically dependent on a data element that does not appear in an ancestor page.

In another embodiment, the method may identify a block as inconsistent if the block is associated with a virtual entry page that is identified as inconsistent.

Where the software program includes a loop, so that in execution a given point is passed more than once, and where in determining whether a given page is upstream of another page, a page is indexed according to the number of times that it occurs in execution of the program. A page of a first index is regarded as upstream of the same page of an index greater than the first index. After at least one occurrence of the loop, each data element of the given entry page is expressed as a function of one or more data elements occurring only in a predetermined number of ancestor pages in previous iterations of the loop.

In a case wherein a block is modified in such a way as to require a modification in a virtual exit page associated with the block, the method identifies all data elements, in downstream entry pages, that are affected by the modification. Similarly in a case wherein a block is modified in such a way as to require a modification in a virtual entry page associated with the block, upstream pages are examined to identify any data element, in the virtual entry page, that lacks a logical dependency on one or more data elements occurring in one or more ancestor pages.

Where a block is subject to a move from its current position within the segment to a new position within the segment, the method identifies all downstream entry pages that are affected by the move and all upstream exit pages are checked to identify whether as a result of the move there are any data elements associated with the virtual entry page for the block that are not available from an upstream exit page so that logical consistency may be maintained. If a block is subject to a move from its current execution path within the segment to a new execution path within the segment, all downstream entry pages are identified in the new execution path that are affected by the move and all upstream exit pages are checked in the new execution path to identify whether as a result of the move there are any data elements associated with the virtual entry page for the block that are not available from an upstream exit page so that logical consistency may be maintained.

In another embodiment, a function defines the dependency of a given data element of the given entry page based on one or more data elements occurring in one or more ancestor pages. The method also assigns a sense to a selected set of data elements occurring in virtual pages of the segment and to a selected set of functions, which affect the selected set of data elements, that are implemented in the segment. It is then determined whether the function, applied to the one or more data elements occurring in one or more ancestor pages, has a sense that is compatible with the sense of the data element of the given entry page or a superset of the sense of the data element of the given entry page. Data elements represented by an identical data structure are assigned the same sense and have an identical set of data validation rules. The senses of the one or more data elements may be arranged into hierarchical levels so that data elements having the same sense level or a higher sense level are compatible and higher sense levels are a superset of lower sense levels.

In an embodiment of the apparatus for identifying inconsistencies in a software program the apparatus includes a block registrar module, a routing map module, a decision expert module and a data transfer expert. The block registrar module identifies a series program blocks constituting a segment. The segment is at least a part of the program where each block has at least one point corresponding to at least one of entry and exit. The routing map module is coupled to the block registrar module and sequences the blocks along a program execution path in which the program executes in a downstream direction. The decision expert module is coupled to the routing map module and determines which execution path to follow when execution path junctions occur. The data transfer expert is coupled to the decision expert module and defines and associates a block representative with respect to each block. The block representative allocates computer memory for data elements that are needed for the associated block to execute, assigns value to any data element required by the associated block to have a value, calls the associated block for execution, receives return of control after execution of the block, and passes control based on available data.

In a further embodiment of the apparatus, a consistency checker module coupled to the data transfer module is included. The consistency checker module, for each given block representative, identifies all data elements, from upstream block representatives, on which the data elements of the given block representative are logically dependent. In another embodiment of the apparatus, a code generator module is included. The code generator module generates executable code based on the blocks after the blocks are found to be consistent.

In another related embodiment of the apparatus the block representative includes a virtual page. The virtual page is a virtual entry page when associated with an entry point and performs the functions of defining and allocating computer memory for data elements that are needed for the associated block to execute, assigning a value to any data element required by the associated block to have a value, and calling the associated block for execution. The virtual page is a virtual exit page when associated with an exit point and performing the functions of receiving return of control after execution of the block, and passing control based on available data. Where the software program includes a loop, so that in execution a given point is passed more than once, the data transfer expert module indexes a page according to the number of times that it appears in execution of the program. The consistency checker module reports a page of a first index as upstream of the same page of an index greater than the first index. For a given entry page in an execution path after at least one occurrence of the loop, each data element of the given entry page is logically dependent, if at all, on one or more data elements occurring only in a predetermined number of ancestor pages in previous iterations of the loop.

The consistency checker module may further include a modification checker component. If a block is modified in such a way as to require a modification in a virtual exit page associated with the block, the modification checker component uses the result to identify all data elements, in downstream entry pages, that are affected by the modification.

If a block is modified in such a way as to require a modification in a virtual entry page associated with the block, the modification checker component uses the result to examine upstream pages to identify any data element, in the virtual entry page, that lacks a logical dependency on one or more data elements occurring in one or more ancestor pages. If a block is subject to a move from its current position within the segment to a new position within the segment, the modification checker component uses the result to identify all downstream entry pages that are affected by the move. If a block is moved from its current position within the segment to a new position within the segment, the modification checker component uses the result to identify all downstream entry pages that are affected by the move and checks all upstream exit pages to identify whether as a result of the move there are any data elements associated with the virtual entry page for the block that are not available from an upstream exit page so that logical consistency may be maintained. If a block is moved from its current execution path within the segment to a new execution path within the segment, the modification checker component uses the result to identify all downstream entry pages in the new execution path that are affected by the move and to check all upstream exit pages in the new execution path to identify whether as a result of the move there are any data elements associated with the virtual entry page for the block that are not available from an upstream exit page so that logical consistency may be maintained. If a block is moved from its current execution path within the segment to a new execution path within the segment, the modification checker component uses the result to identify all downstream entry pages that are affected in the current execution path by the move to the new execution path and to check all upstream exit pages in the current execution path to identify whether as a result of the move to the new execution path there are any data elements associated with the virtual entry page for the block that are not available from an upstream exit page so that logical consistency may be maintained.

In yet another embodiment, the consistency checker module further includes a formula consistency component. The formula consistency component assigns a sense to a selected set of data elements occurring in virtual pages of the segment and to a selected set of functions, which affect the selected set of data elements, that are implemented in the segment. The formula consistency component also determines whether the function, applied to the one or more data elements occurring in one or more ancestor pages, has a sense that is compatible with the sense of the data element of the given entry page or a superset of the sense of the data element of the given entry page. The formula consistency component may assign the same sense to data elements that are represented by an identical data structure and uses, with respect to such data elements, an identical set of data validation rules. The formula consistency component may also arrange the senses of the one or more data elements into hierarchical levels so that data elements that have the same sense level or a higher sense level are compatible and higher sense levels are a superset of lower sense levels.

BRIEF DESCRIPTION OF THE DRAWINGS

The foregoing features of the invention will be more readily understood by reference to the following detailed description, taken with reference to the accompanying drawings, in which:

FIG. 9 is a mathematical group representation of two data elements A and B having the same "sense."

FIG. 10 is a mathematical group representation of data elements A and B which are deemed consistent even though A and B are not the same, because "sense" A is a subset of "sense" B.

FIG. 11 is a mathematical group representation where two data elements A and B are not the same and are deemed inconsistent because sense A and sense B are disjunct.

DETAILED DESCRIPTION OF SPECIFIC EMBODIMENTS

In accordance with a preferred embodiment of the invention, a method can identify inconsistent data elements in a program segment of a computer program so that the program is easy to modify and repair by a programmer. In such an embodiment of the system, if the segment includes an inconsistency, the inconsistency is flagged and indicated visually to the programmer. The embodiment checks for both functional consistency and component consistency.

For the purposes of the description herein and the claims that follow it, unless the context otherwise requires, the term "block" refers to any functional piece of code and may include functions, object-methods, forms, hyper text markup language (HTML), World Wide Web pages, or computer language code. As used in this description and the accompanying claims, the term "computer language code" refers to the text for any known system of associating commands with a computer, such text may be in languages including Java, Basic, C, C++, Fortran, Pascal or assembler but are not limited to the preceding list. A "data element" within the description and the claims may be, but is not limited by the terms variable, object, class, table, list, formula and figure. As used in this description and the accompanying claims, a "virtual entry page" or "virtual exit page" is defined as an aggregate of data elements but it may also be empty of data elements.

In one embodiment of the method, a programmer identifies a segment of computer language code and divides the code by specifying blocks in the program segment. A few examples of blocks are an object, from an object oriented computer language, a component object model (COM)

object, a common object resources brokering architecture (CORBA) object, or even a simple function. The segment of code may be divided into blocks based on the functionality of the code, based on objects in an object-oriented environment, or divided in any other fashion such that there are points of entry and exit to the blocks. An entry point is a point in a block where execution of the block may begin and an exit point is a place where program leaves the block producing output or changes to data elements. The segment is divided so that the blocks lie along an execution path which flows in a downstream direction. Blocks may be divided into sub-blocks, so long as the sub-block has at least one point of entry and at least one point of exit.

Figure 1:
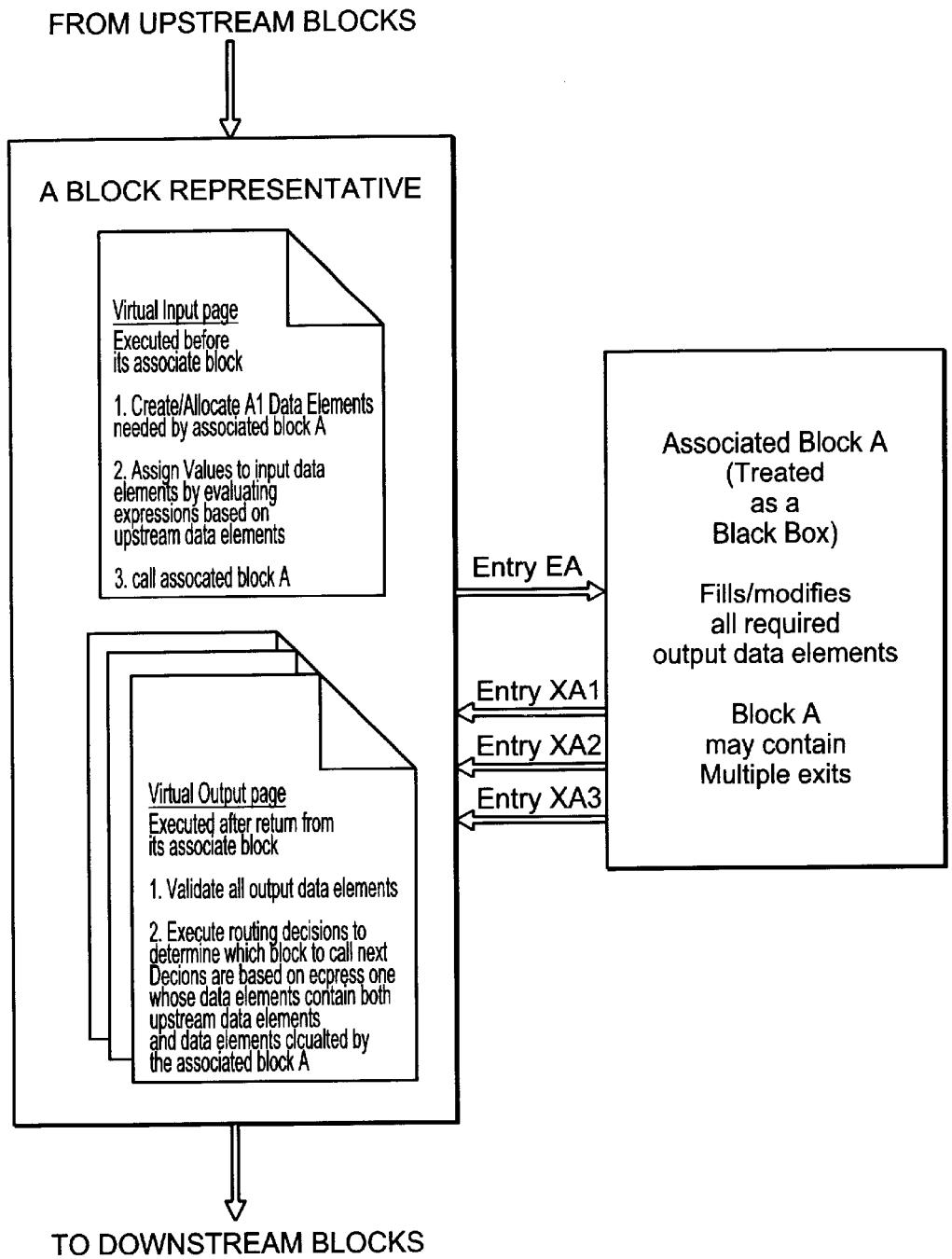
FIG. 1 is a block diagram of a program block and a corresponding Block Representative.

Associated with each block of code is a Block Representative as shown in FIG. 1. The Block Representative performs the input and output functions for the block. The input functions of the Block Representative include allocating computer memory for data elements that are needed for the associated block to execute, assigning a value to any data element required by the associated block to have a value by evaluating expressions based on upstream data elements, and calling the associated block for execution. The output functions of the Block Representative include receiving return of control from the block and validating all of the output data elements. The Block Representative also executes routing decisions based on available data and passes control to another Block Representative. The decisions for routing are based on expressions whose data elements contain both upstream data elements and data elements calculated by the associated block.

Figure 2:
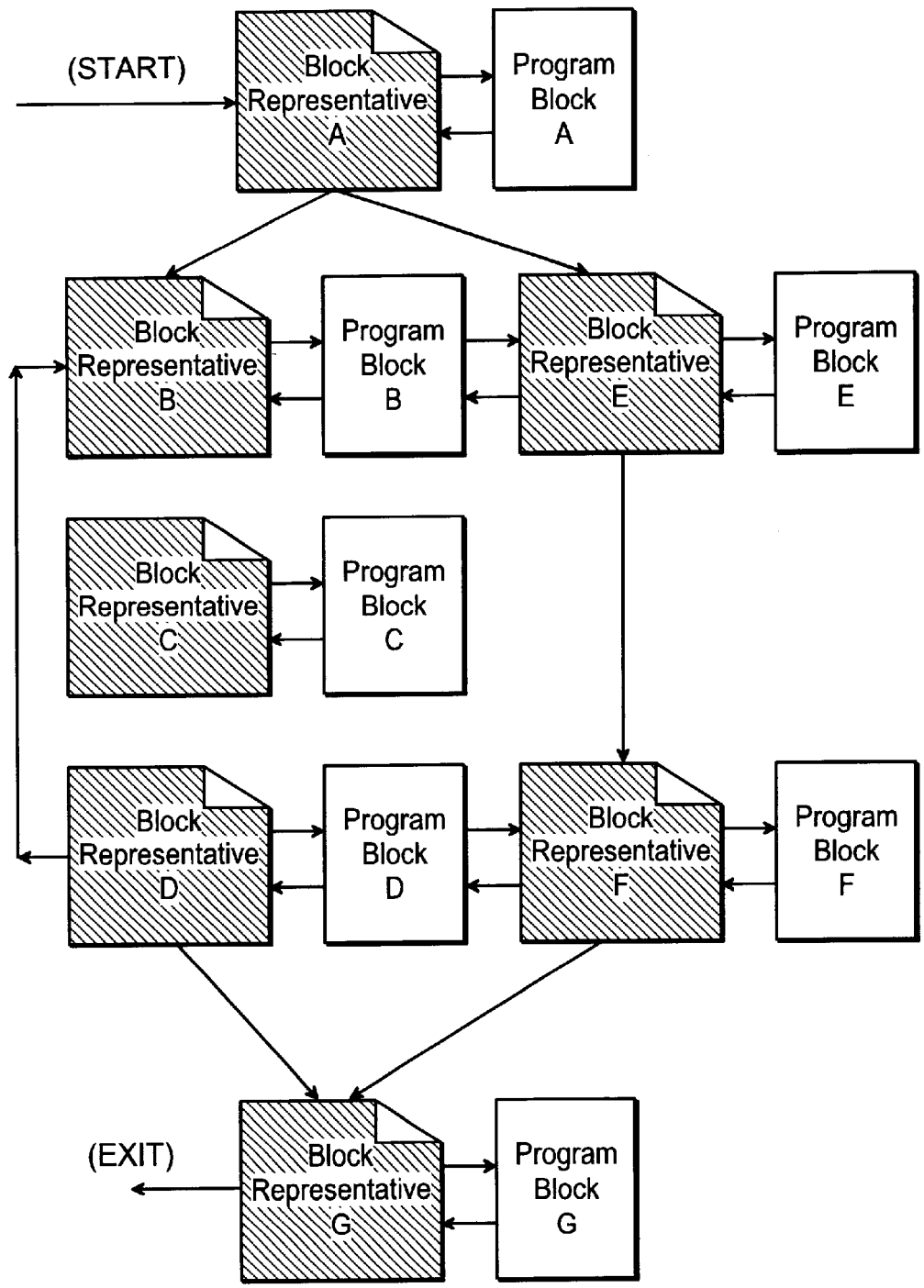
FIG. 2 is a flow chart of a portion of a computer program segmented into blocks where each block has a corresponding Block Representative.

FIG. 2 shows a code segment divided into blocks where each block has a corresponding Block Representative. Prior to a code segment being tested for consistency, the control structure of the code is enabled through the creation of Block Representatives for each block of code. The control structure is arranged so that a code segment is executed in the following manner. First, a Block Representative of the first block in the code segment, for example Block Representative A in FIG. 2, is called and all of the input functions are performed. Next, the Block Representative turns over control to the block, Program Block A. The block executes and fills in or modifies all output data elements. Finally, for Program Block A, the output functions are initiated when the Block Representative, Block Representative A, regains control from the block. Control is then passed to the next Block Representative in the code segment, which in FIG. 2 would be either Block Representative B or Block Representative E depending on the execution path, until the segment is completed.

The input functions and data elements of each point of entry of a block can conveniently be associated with a structure known as a virtual entry page and the output functions and output data elements of each point of exit of a block can be associated with a virtual exit page. Consequently, the Block Representative includes virtual entry page for the block, and the virtual exit page for the block. A Block Representative may contain more than one virtual exit page depending on the number of exit points from the associated block. The virtual entry page provides a data structure that is sufficient to permit the associated block to execute without any further reference to any other part of the computer program code. The virtual exit page provides a data structure that verifies the output data and can redirect control of the program to another Block Representative. As a result, the Block Representative forms a "white box" that represents and manages the corresponding block or "black box". Execution of a block, computer segment or program can be controlled via the corresponding Block Representatives. Only a Block Representative is needed to preserve the consistency of the block provided that all changes to a block are registered with the corresponding Block Representative. For simplicity and clarity of explanation in the remaining figures and description, blocks are presented with their associated virtual entry pages and virtual exit pages. These blocks could be equally represented with their associated Block Representatives.

Figure 3:
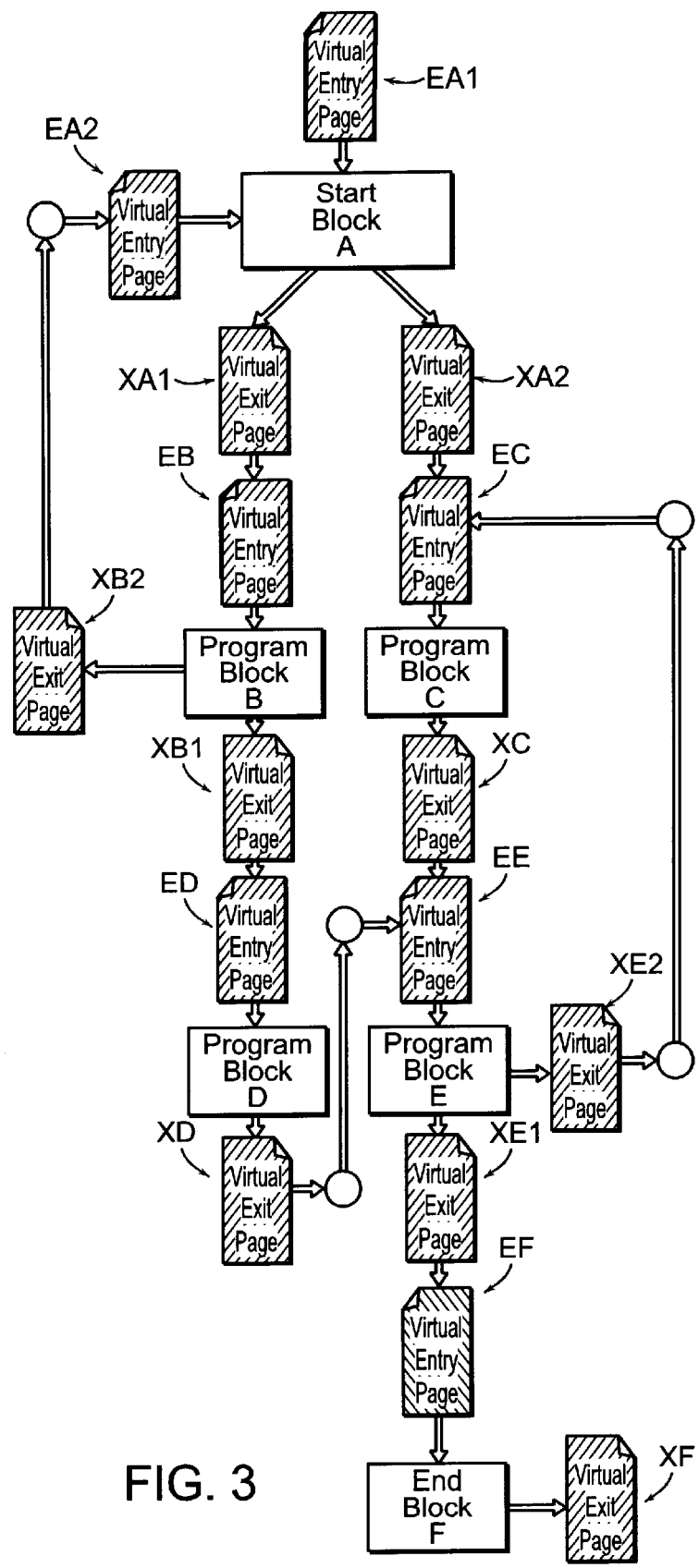
FIG. 3 is a flow chart of a portion of a computer program segmented into blocks where each block has an associated virtual entry and virtual exit page.

In FIG. 3 is shown a segment of computer program which is separated into blocks for verifying the consistency of data elements within the segment. The program segment is divided into blocks A, B, C, D, E and F.

Because block A is the first block of the program segment it has a virtual entry, known as a "virtual start page" EA1, which provides the data for the initialization of the program segment. Block A also has a second virtual entry page EA2 which is associated with a second point of entry that is distinct from the start of the program segment. The point of entry for the second virtual entry page EA2 is associated with the virtual exit page XB2 of block B.

The virtual exit page contains the data elements that are generated or modified by the block of code for use by blocks encountered later in the execution path or for output. Block A has two such virtual exit pages. The first virtual exit page XA1 is associated with the entry page EB of block B, and the second virtual exit page XA2 is associated with the entrance page EC of Block C. Each virtual entry page has predecessor virtual pages known as ancestor pages (except for the first virtual entrance page i.e. the virtual start page, which is at the beginning of the segment which may receive user input or obtain information for execution from another source such as a file which initializes the program segment).

Some of the ancestor pages for the virtual entrance page EF for block F are the virtual entry page EE and the virtual exit pages XE1, XE2 of block E and the virtual entry EC and exit page XC of block C. The ancestor pages of Block E are the virtual entry and exit pages for blocks A, B and D. The final block, namely Block F, has a virtual exit page XF, termed the virtual end page. The virtual end page has data elements provided as an output associated with the segment.

An object oriented programming environment is well suited to an embodiment of the present invention. Objects provide a natural blocking boundary and therefore with the virtual entry and exit pages may associate input and output parameters respectively for each object. In accordance with one embodiment of the invention, there may be employed, for example, ActiveX objects, in a Visual Basic environment available from the Microsoft Corporation of Redmond, Washington. Visual Basic may be used for generating object based code. In this embodiment, the ActiveX objects each represent a block of the program. Each ActiveX object is assigned a virtual page which defines all necessary parameters for the object and allocates memory for the parameters. The virtual page also initializes and sets needed parameters and calls the relevant code, such as the objects, methods or functions of the block and also decides which virtual page is next in sequence.

To analyze operation of the program code, embodiments of the invention utilize virtual pages to track the effect of blocks on data elements associated with the virtual pages. Such embodiments rely on the principal that in the case of execution, the program operates on the data elements associated with an entry page of a block and provides data elements in an exit page. The differences between data elements in an entry page associated with a block and in an exit page associated with a block are therefore attributable to the effect of the block.

An execution path in a program segment can therefore be understood as a sequence of virtual pages starting with the first virtual entry page of the segment and terminating with the output of the segment with each page being followed by its immediate successor. An execution path represents a possible execution sequence of a program or program segment. An execution path defines a mapping of successive virtual pages associated with the blocks of a segment.

For a given representative execution path, the data elements in any virtual entry page may be understood as functions of the data elements in preceding virtual exit pages and the entry page at the start of the segment. The data elements contained in the virtual entry page at the start of the segment are typically without values and receive values when the program segment is executed. Program execution can be triggered either directly by a user who fills in the virtual entry page at the start of the segment or through a function call that will set the values of the data elements in the virtual entry page.

Figure 4:
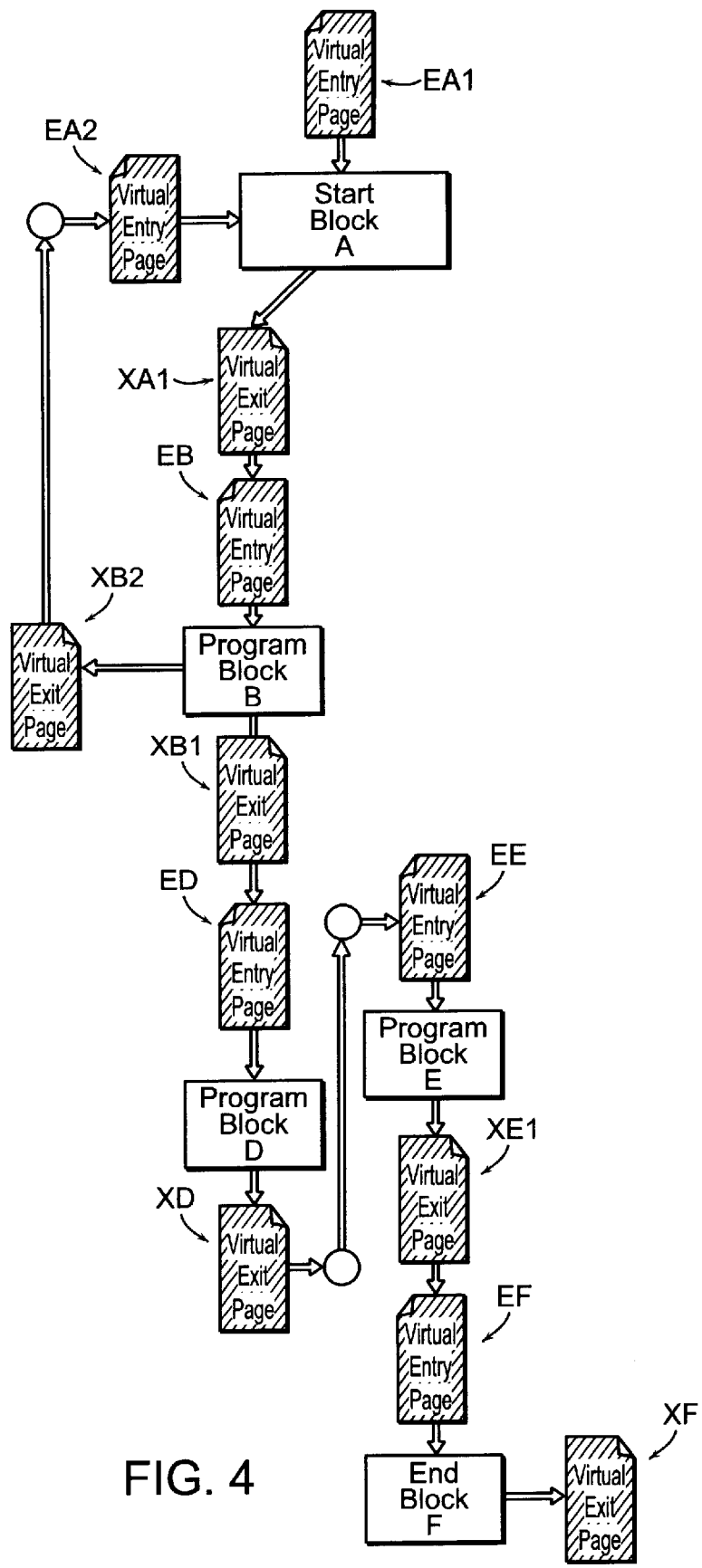
FIG. 4 is a flow chart of a segment of the computer program of FIG. 3, containing a loop.

A program segment may have an infinite number of execution paths. For example, FIG. 4 is a flow chart of a segment of the computer program of FIG. 3, containing a loop. The code contains a loop between block A and block B but follows a direct path through blocks D, E, and F. A possible execution path is through blocks A, B, D, E, F, which is a direct path without accessing the loop. The virtual exit page XA1 of block A precedes the virtual entrance page EB of block B. The virtual exit page XE1 of block E can depend on the virtual entrance pages of the preceding blocks and the information that is provided as an input at the beginning of the segment. In this case, disregarding the loop between XB2 and block EA2, virtual entrance page EE can depend on the virtual exit pages of blocks D XD, B XB 1, XB2 or A XA1 and the data elements that are provided as an input into block A in the virtual start page EA1.

Figure 5:
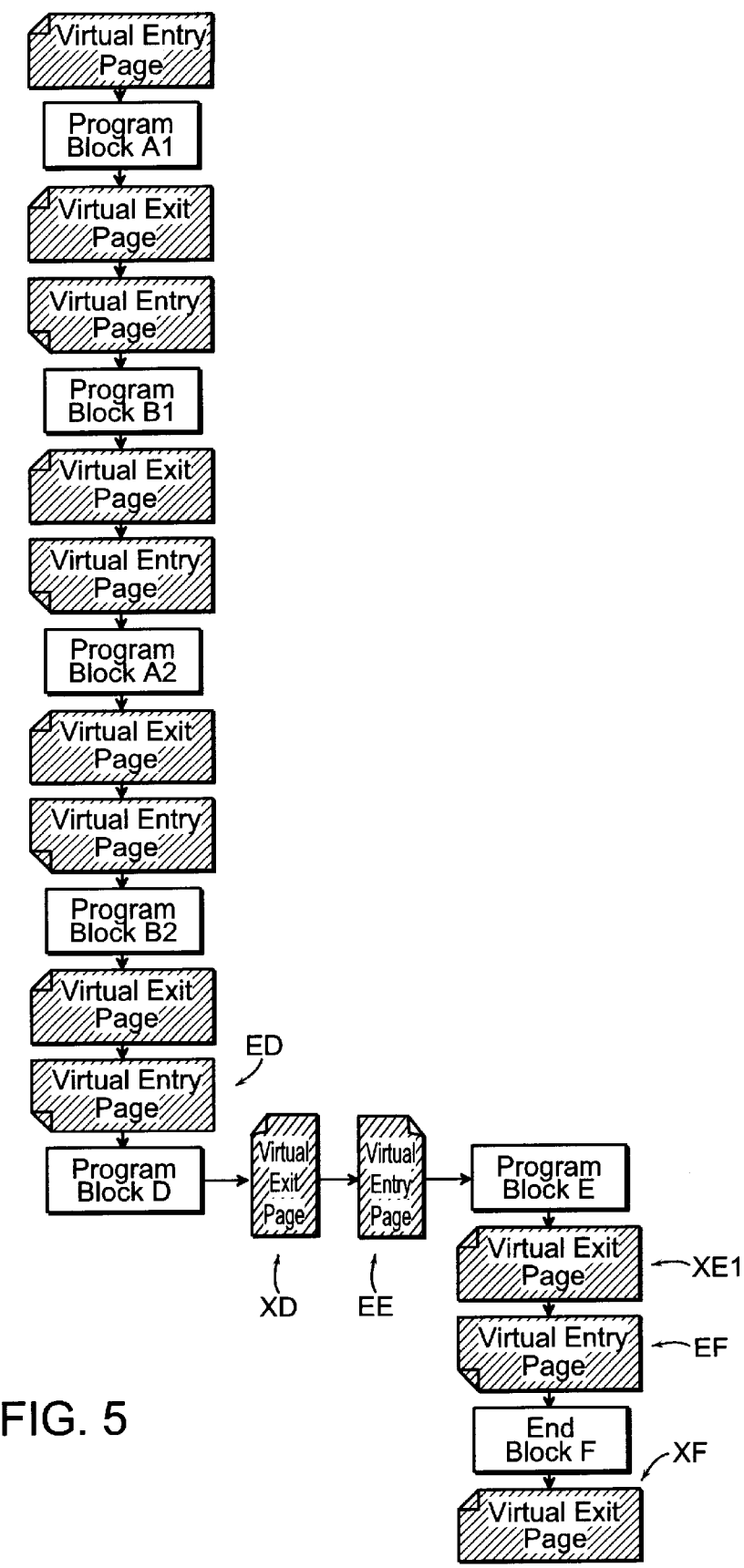
FIG. 5 is a flow chart of a segment of the computer program of FIG. 4, which shows an execution path in which a set of blocks are traversed twice as a result of a loop.

FIG. 5 is a flow chart of a segment of the computer program of FIG. 4, which shows an execution path in which the path between blocks A and B is traversed twice, as a result of the loop previously mentioned. Block A is accessed a first time as indicated by the suffix "1", which is its index number, and then again a second time as the program loops. The second time block A is traversed it is indicated with a suffix "2." Likewise block B is accessed twice as is indicated in each case by the suffix "1" and the suffix "2." All of the other blocks (D, E ,F) are accessed only once. All the virtual pages of blocks that precede a block are ancestor pages of that block. Hence the virtual entry and exit pages of blocks A1, B1 and A2 are ancestor pages of block B2.

In a preferred embodiment, the method and apparatus of the invention may handle a loop by providing a finite number of execution paths for a segment that has loops. For this particular segment in the example, a representative partition is created by limiting the number of executable loops to a finite number, for example 2, to create a finite representative path.

It is therefore a principal of a preferred embodiment of the invention that a representative path can approximate all the data elements that are necessary for maintaining consistency in the program, so that each of the virtual entry pages following the initiation of a loop can be updated from definite data element from ancestor pages within the program segment without having an infinite number of execution paths and indeterminate data elements. As a mathematical proof, let E be the set of all execution paths. The representative partition=exists that creates a finite number of equivalence classes for E. A Mapping exists wherein $y=R(x)$, $x,y \in E$, such that if $x \approx y$ then $R(x)=R(y)$. That is, $R(x)$ defines a unique representative path for each class. All members of the same class have an identical representative and the representative belongs to the class. In addition, the mapping $y=R(x)$ defines uniquely the values of all data elements in y in terms of data elements in x. The representative execution path fully represents the path with respect to the data elements contained in any of the class paths. The representative paths are therefore sufficient to represent the infinite possible execution paths that a loop creates. In summary, a method, in accordance with a preferred embodiment of the invention, limits the number of execution paths to a finite number, and then uses another finite number to limit the number of occurrences of a loop. Each generation of a loop receives an index value. During the first pass through the loop, the blocks within the loop receive the index one. The second time the loop is accessed the blocks within the loop pages, associated with traversing around a loop, and the data elements related to those indices, are retained in the method of this embodiment. In the program segment as represented in FIG. 5, the total number of loops could be limited to the finite number one hundred, for example, but only iterations ninety-nine and one hundred of the loop will make up the representative path.

Consistency

A program segment is consistent if the segment is capable of compiling, executing and producing results of the segment that are as expected by the designer of the program. In a preferred embodiment consistency takes two forms: component consistency and functional consistency.

Component Consistency

Component consistency occurs when a data element from a virtual entry page of a block is logically dependant. Virtual entry pages can be said to be logically dependant if there is a function for the data elements of the virtual entry page of a given block which is based on the ancestor pages of the virtual entry page within a given execution path. For example, if block A has a data element in its virtual exit page called "X" and block B has a data element in its virtual entry page "Y" which is a function of "X" of the form $Y(X)=2*X$, and block A and B are in the same execution path, then the virtual entry page of block B is logically dependant on the virtual exit page of block A and data element, "Y", is component consistent. A program segment is defined to be component consistent with respect to the partitioned blocks if and only if a representative partition exists for the segment and for every representative path each data element is logically dependent.

A program segment is "component inconsistent" if one or more data elements, on which a given virtual entry page depends are missing from the execution path. A program segment would be inconsistent if in block B there was a data element $Y(X)=2*X$ in the virtual entry page and there was not a data element "X" in any preceding page nor a data element "X" entered into the entry page of the first block of the segment by a user or accessed from another outside source, such as a file.

In accordance with a preferred embodiment of the invention, a component consistency checker performs the following steps. It identifies all representative paths. For each representative path, all of the virtual entry pages are identified and all dependencies are identified for each data element. All of the functions are analyzed to identify all of the data elements within previous virtual entry pages that are necessary for determining the current data element of the current virtual entry page. The virtual page is component consistent only if all of the data elements exist in the previous ancestor pages.

Figure 6:
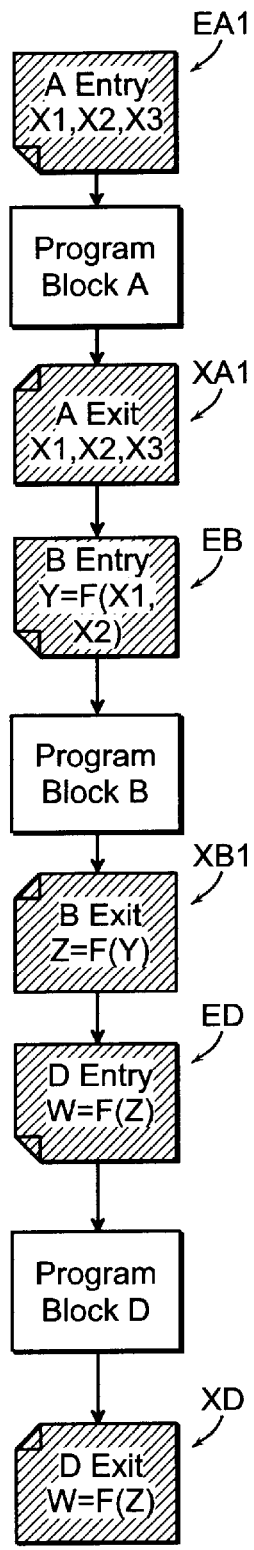
FIG. 6 illustrates the data element structure associated with virtual pages in a portion of the segment illustrated in FIG. 4.

FIG. 6 illustrates the data element structure associated with virtual pages in a portion of the segment illustrated in FIG. 4. FIG. 6 shows a block diagram of a program segment broken up into three blocks A, B, and D along with the variables and formulae that are present in each block's virtual entry and exit page. The entry page EA1 of block A contains three variables "X1," "X2," and "X3." The Virtual exit page XA1 of block A contains the same three variables. The virtual entry page EB of block B contains one variable which is variable "Y."Variable Y is dependent on variables X1 and X2. The virtual exit page XB1 of block B also contains variable Z which is dependent on Y. The entry page ED to block D contains variable W which depends on variable Z.

Figure 7:
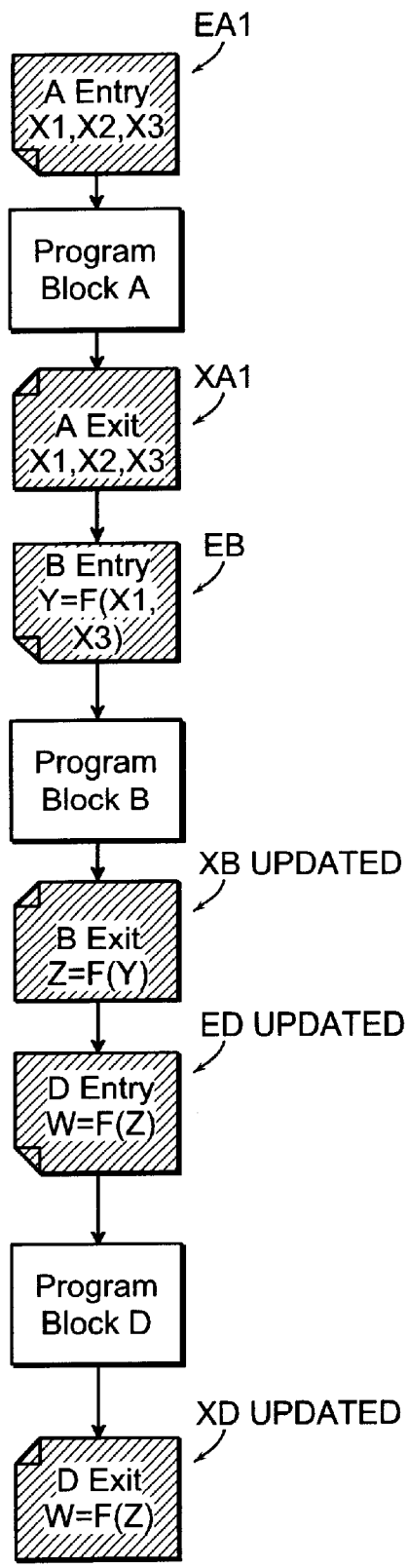
FIG. 7 illustrates the effect of making an edit to a block in the segment shown in FIG. 4.

FIG. 7 illustrates the effect of making an edit to a block in the segment shown in FIG. 6. The entry page EB to block B is changed. The variable Y no longer depends on X1 and X2, it now depends on X1 and X3. The result of this change is directly reflected in all subsequent blocks which reference variable Y. The exit page XB of block B contains the updated information as well as the entry ED and exit page XD of Block D. Through the indirect reference to Y, variable W of the virtual entry page ED of block D is updated. Because W depends on Z and Z depends on Y and Y now depends on variable X1 and X3, the change is updated throughout the segment through the chain of connections.

Figure 8:
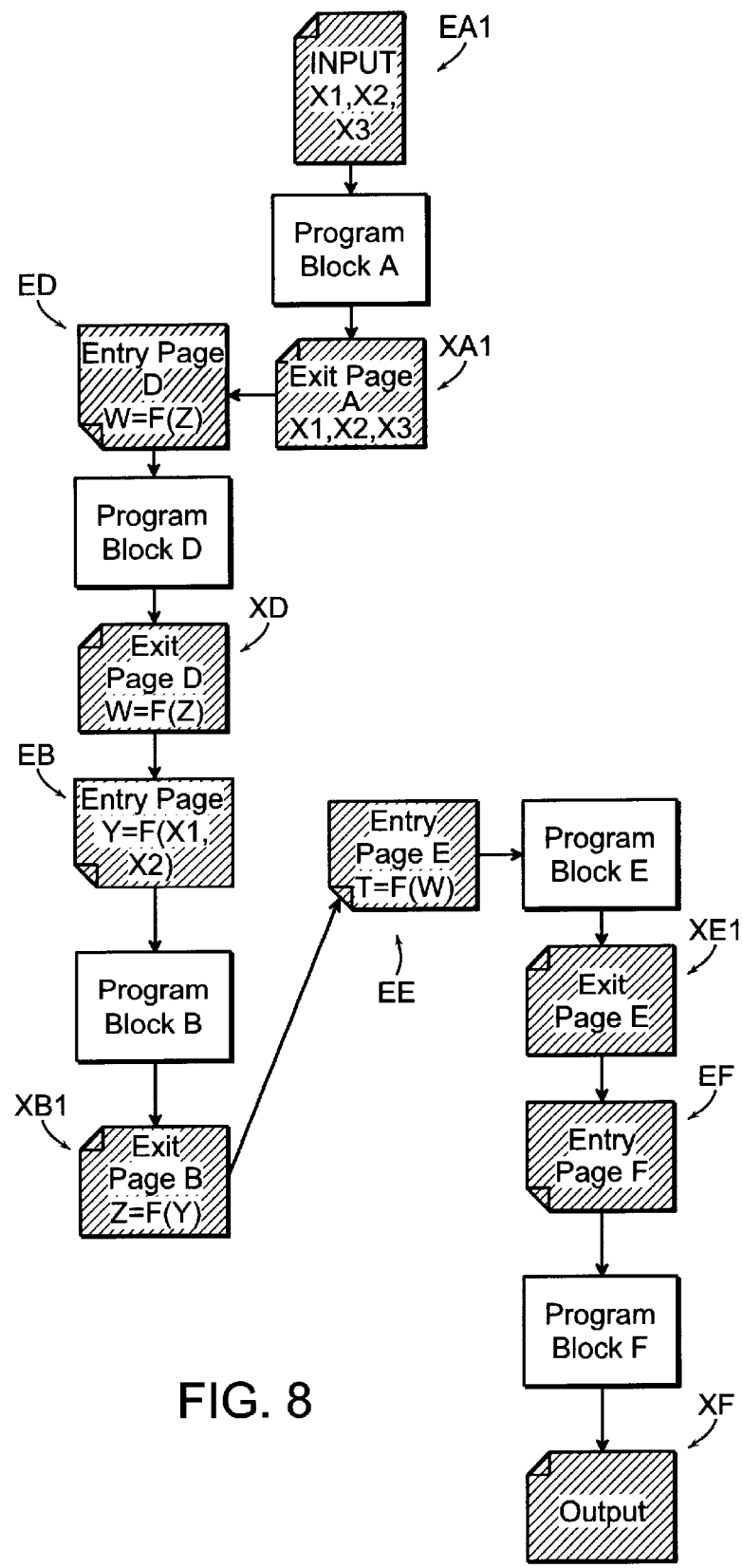
FIG. 8 illustrates with respect to the program segment of FIG. 4, the effect of moving an entire block from its present position to a new position.

FIG. 8 illustrates, with respect to the program segment of FIG. 4, the effect of moving an entire block to a new position. A user might decide that a block is more appropriately located in a different place in the program. If the block is moved to a subsequent point in the program, the consistency checker will identify all downstream blocks that rely on the elements from the virtual entry page of the block and update the changes accordingly or note any inconsistencies. Likewise the consistency checker will look at all upstream blocks to see if the data elements that are required to define a data element in a specific block's virtual entry page are available from an upstream block. Using FIG. 4 as a reference, the sequence of blocks is A, B, D, E, F. In the example of FIG. 8, Block D is moved above Block B, so the sequence of the segment is now A, D, B, E, F. The consistency checker scans at the virtual entry page ED of block D identifying that variable W is required. Looking further, the consistency checker notes that W depends on Z and that Z has not yet been defined in any previous virtual pages. As a result the entry page ED of Block D is flagged and an error message is displayed indicating that there is an inconsistency in the program. The entry page EB of Block B has no error associated with it since it requires variable Y which is a function of X1 and X2 which have been defined in the virtual entry page EA1 of previous block A[[, B]]. The entry page EE of Block E, on the other hand, is flagged since variable W which was defined previously in the virtual entry page ED of block D is still inconsistent because variable Z depends from the undefined variable Y.

Functional Consistency

Figure 9:
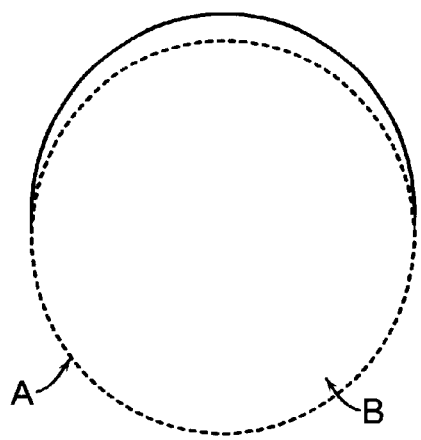
FIGS. 9 to 11 illustrate relationships pertinent to interpretation of the "sense" of a data element.
Figure 10:
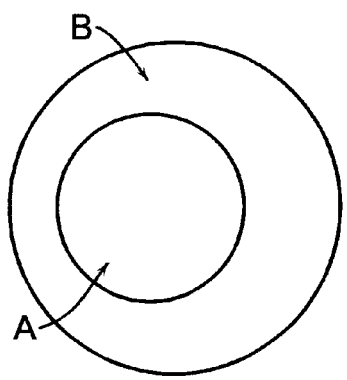
Figure 11:
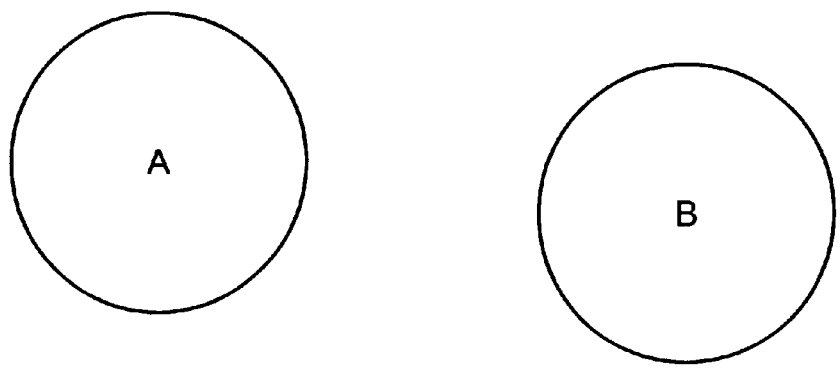

Functional consistency denotes that the "sense" of both sides of a function are either equivalent or that the "sense" of an element on one side of a function is a superset of the "sense" corresponding to the other element. In general demarcation of the "sense" provides another layer of consistency checking on top of the typical compiler data type checking. If data elements X1, X2, X3 have senses, then each function used in the program which contains elements X1, X2, X3 are also assigned a sense. FIGS. 9 through 11 illustrate relationships pertinent to interpretation of the sense of a data element. Each of the circles in these figures represent the data structure of a data element.

FIG. 9 is a mathematical group representation of two data elements A and B having the same sense. They also have identical representative data structures as a result. Circle A coincides with circle B and therefore they both share a data structure.

FIG. 10 is a mathematical group representation of data elements A and B which are deemed consistent even though A and B are not the same, because "sense" A is an element of a superset corresponding to "sense" B. The sense of data element A is a subset of the sense data element B is represented by circle A being positioned inside of circle B. If a variable called A was given the sense "car," variable B might be given the sense "vehicles" and since a car is a subset of the group, "vehicles", variable A is consistent with variable B. In another example, an object A would have a sense which would be (functionally) consistent, but a subset of the data structure for its inherited object B, since the inherited object B adds additional elements to the data structure of A.

FIG. 11 is a mathematical group representation where two data elements A and B are not the same and are deemed inconsistent because sense A and sense B are disjunct. Circle A does not cross or overlap circle B. A functional inconsistency between data elements A and B exists. In a segment, if data element A was set equal to data element B the consistency checker would note that the data elements do not equate based solely on their functional senses. The functional consistency checker would flag the equation and indicate that there was an inconsistency between the data elements.

An Embodiment of the Apparatus for Structuring Computer Program Code

Figure 12:
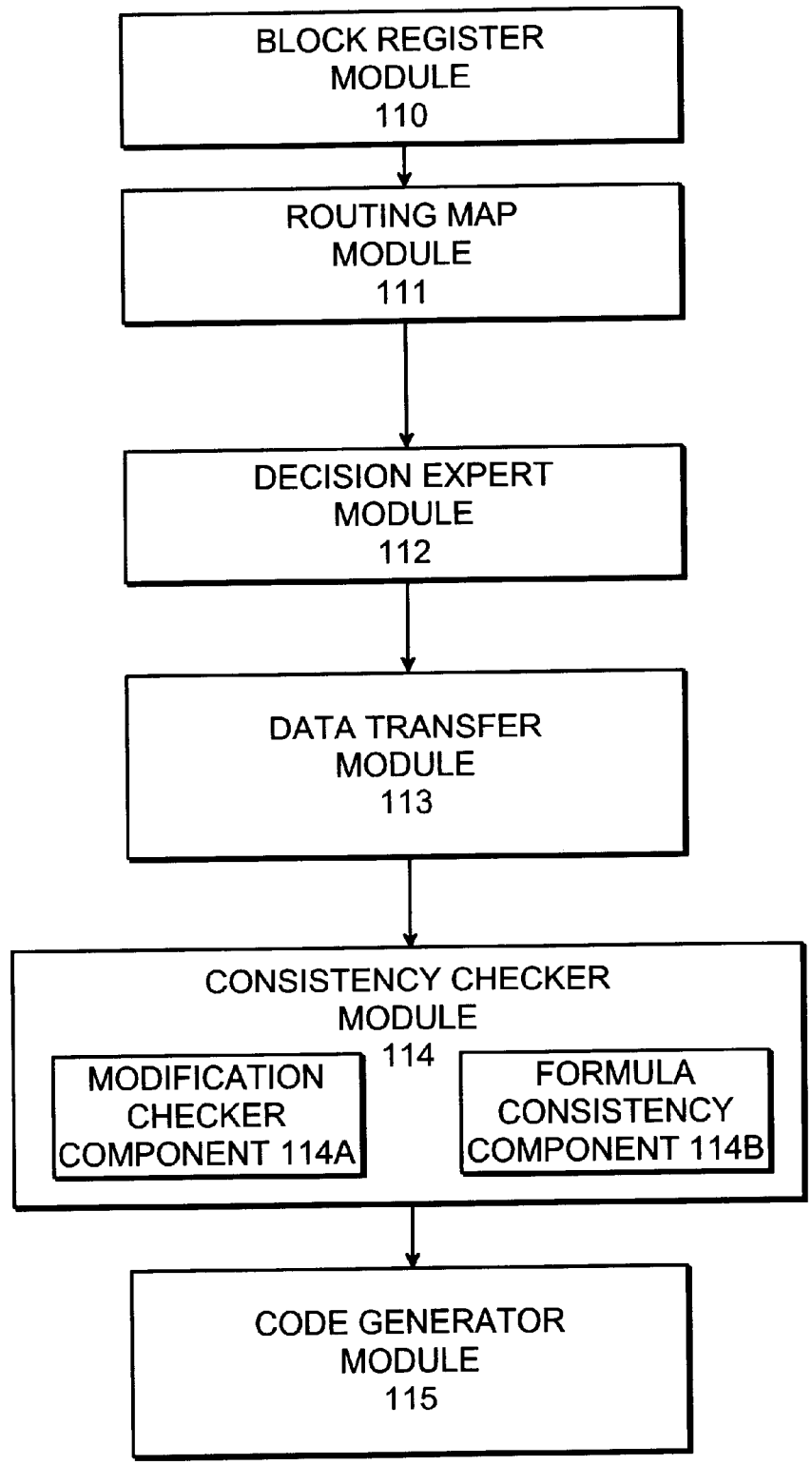
FIG. 12 is a block diagram representing the six modules that form one embodiment of the invention.
Figure 13:
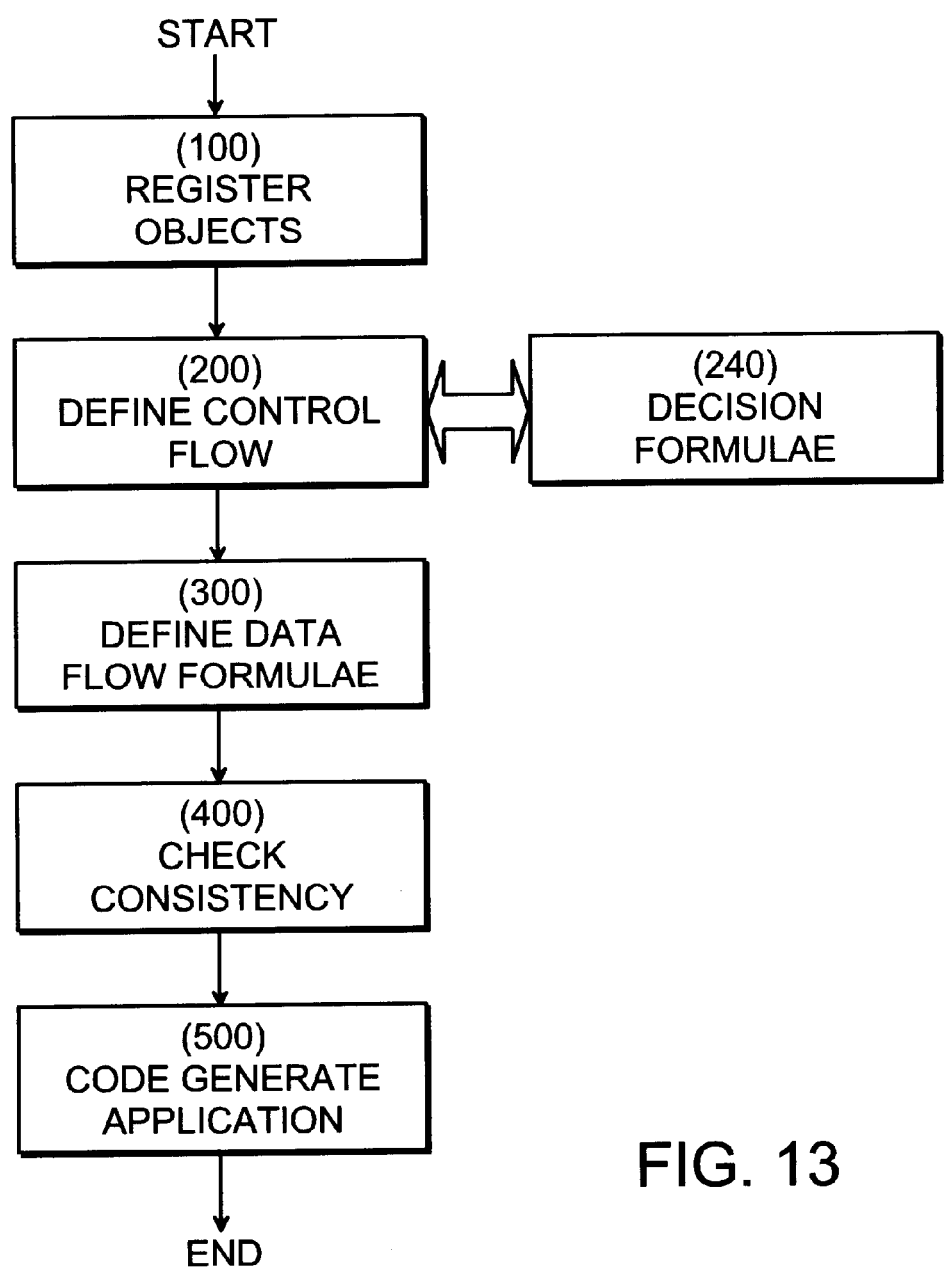
FIG. 13 is a flow chart showing the steps used in developing a program in accordance with one embodiment of the invention.

An embodiment of the apparatus for structuring computer program code includes six modules: a block registrar module, a routing map facility module, a decision expert module, a data transfer expert module, a consistency checker module, and a code generator module as shown in FIG. 12. FIG. 13 illustrates the steps used in developing a program and checking the program's consistency using the six modules.

Figure 14:
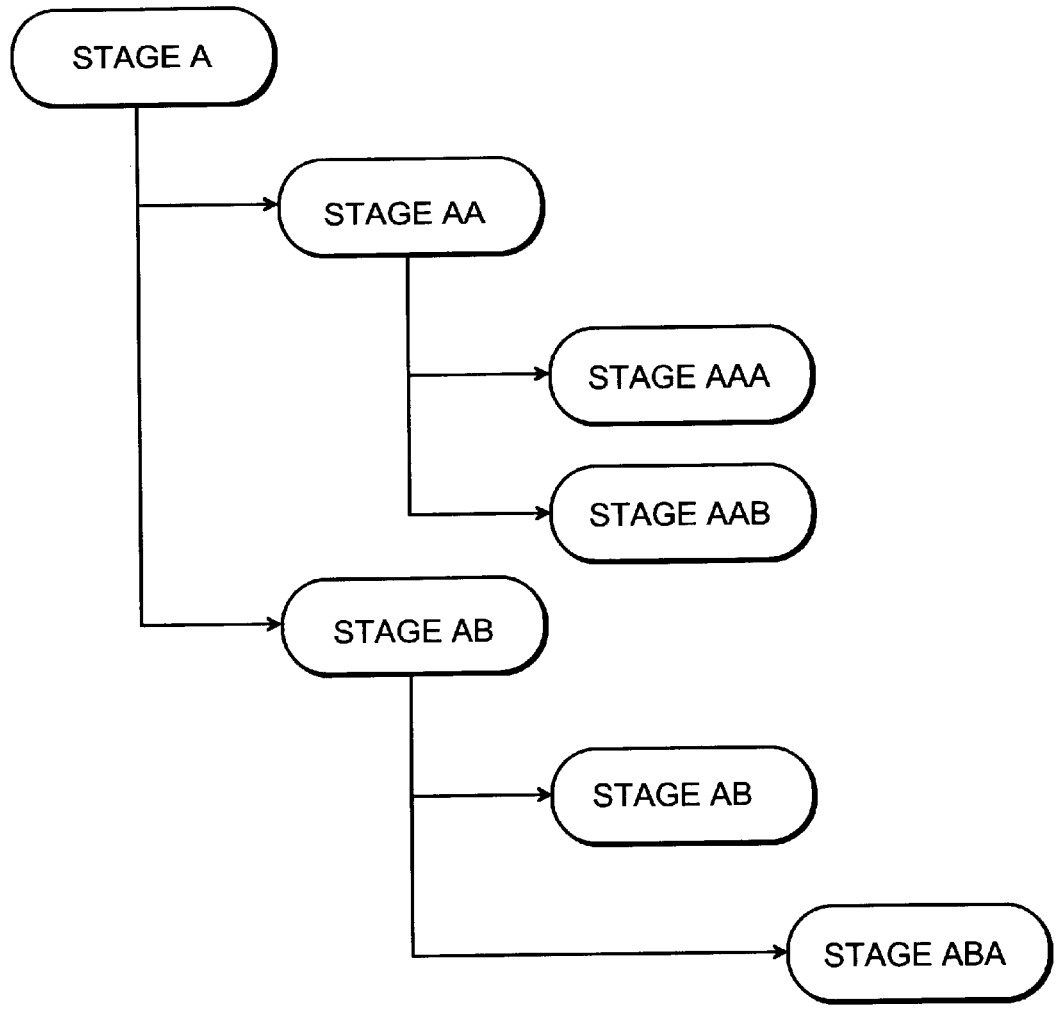
FIG. 14 is a flow chart of a program divided into stages which are organized hierarchically.
Figure 14:
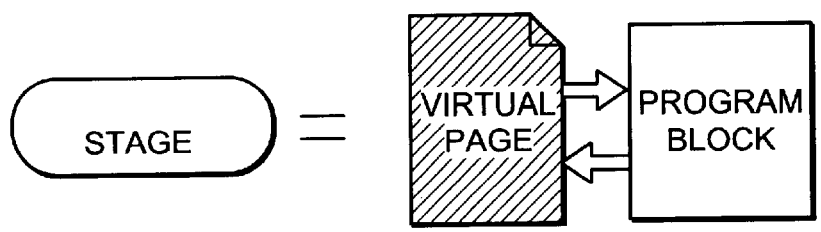

To facilitate development of a program, a program developer divides the program into stages which are organized hierarchically as shown in FIG. 14. Each stage consists of a Block Representative and a block of computer code. The program developer uses the block registrar 110 to register all blocks of computer code. In the registration process, all input and output parameters of each block and all additional information needed to activate the objects-methods of the block are defined (Step 100).

Figure 15:
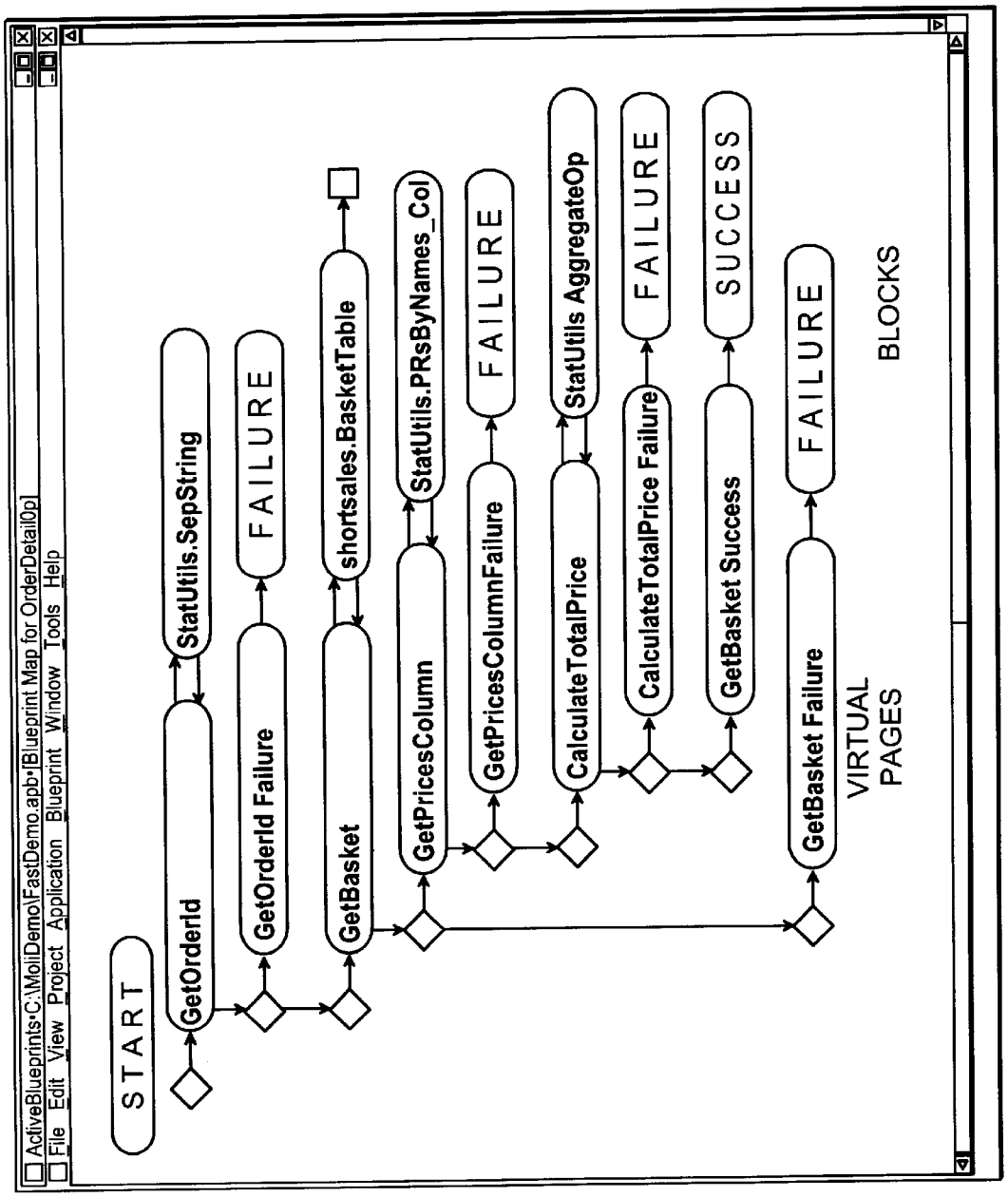
FIG. 15 is a screen shot displaying an example of a routing map screen.

The program developer then uses the routing map facility 111 to define the sequence of blocks (Step 200). FIG. 15 is a screen shot which shows an example of a routing map. The routing map screen allows the developer to define execution paths and place the blocks along the various paths. In conjunction with the routing map, the decision expert 112 creates 'decision' formulae from the routing map that are required to determine which execution path to follow when path junctions occur and saves the 'decision' formulae for retrieval (Step 240). The routing map facility 111 can support loops using representative paths as previously discussed.

Figure 16:
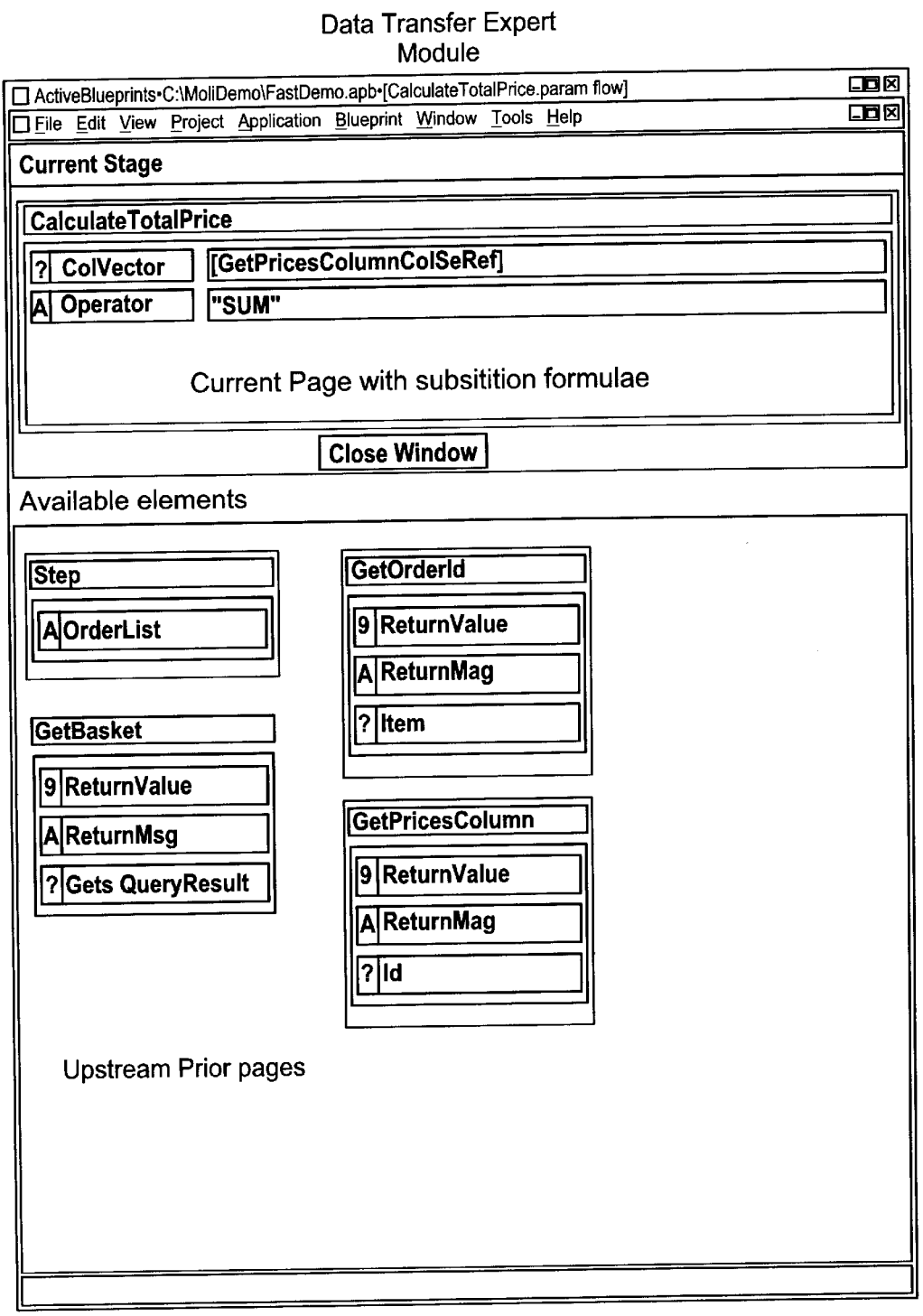
FIG. 16 is a screen shot displaying an example of a data transfer expert screen.

Following the route mapping 111 and decision expert 112, the program developer employs the data transfer expert 113 to define data transfer formulae needed to initialize and set data elements required by each virtual page. The data transfer expert 113 allows the developer to define data elements as a function of upstream values, so that the data elements of a given virtual page are logically dependent on data elements from previous pages. (Step 300) Once the data elements are defined, the developer may cause the data transfer expert 113 to transfer the data elements to the virtual page. A screen shot showing the data transfer expert is provided in FIG. 16.

The flow control of the program segment has been defined in the routing map module 111 and the decision expert module 112 and the data flow between virtual pages is defined by the data transfer expert 113. The three prior steps create all the information needed so that the program block may operate as a "black box" and the virtual pages making up a Block Representative may operate as a "white box". The virtual pages are a representation of the program blocks and are all that is needed for determining consistency.

Figure 17:
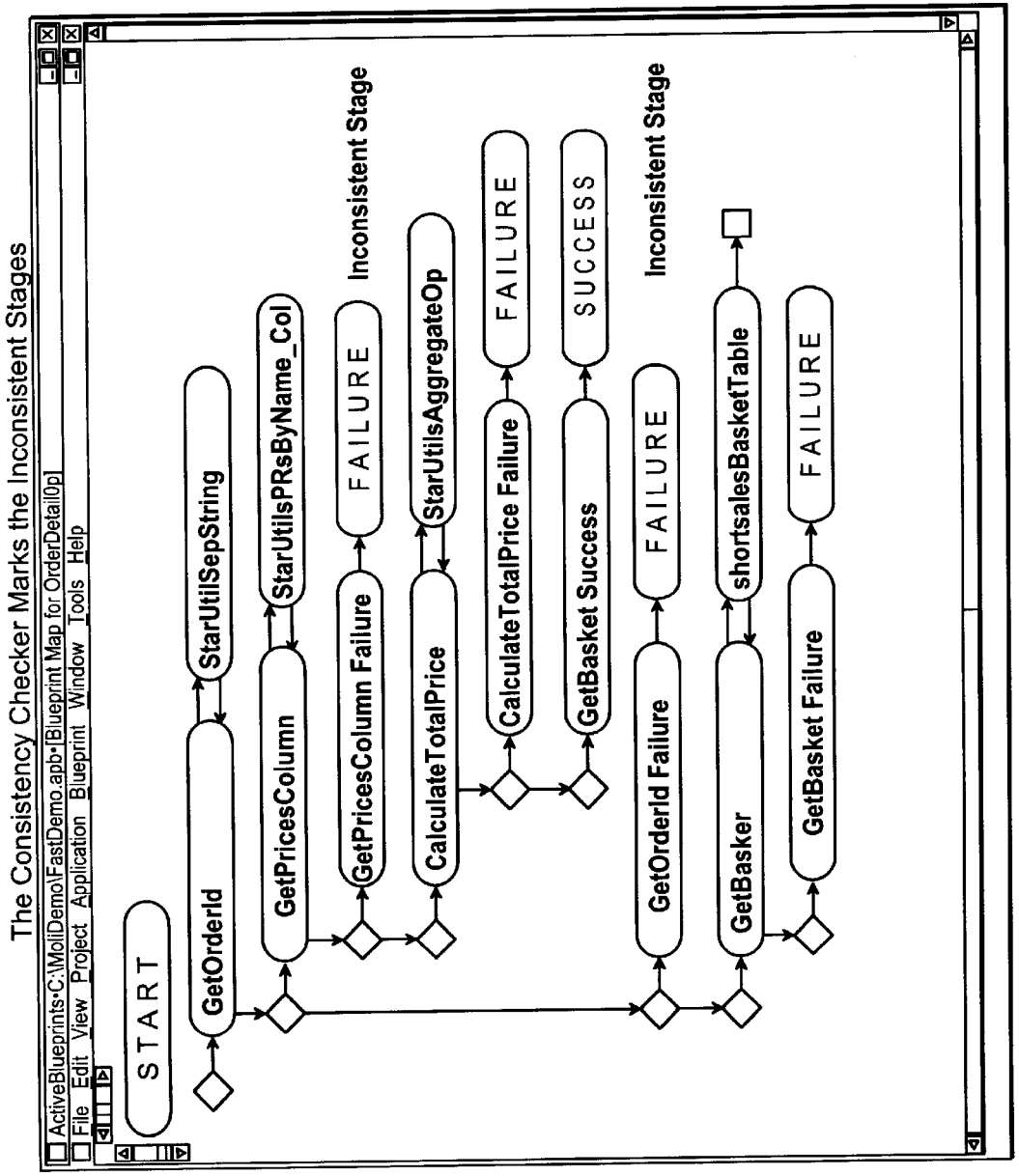
FIG. 17 is a screen shot displaying an example of a consistency checker screen.

Next, the program developer can activate the consistency checker 114 to test the consistency of each page (Step 400). The consistency checker can be activated at every stage and it will mark all pages which are both component consistent and functionally consistent and flag all inconsistent pages as shown in FIG. 17.The consistency checker module may contain two sub-components: a modification checker component 114a and a formula consistency component 114b. The modification checker component 114a is activated whenever a change is made to the code and it analyzes the code to see if the modification effected any upstream or downstream code blocks. The formula consistency component 114b performs the functional consistency check where "senses" are verified.

Once the program is consistent, a virtual page code generator 115 will produce the application.

This process is geared to accelerate software development time by increasing the efficiency with which errors are found within the code. Alternatively if a computer program already exists, a developer may divide the program into program blocks and then implement the preceding steps for the purpose of checking consistency and keeping the program code consistent if revised.

Figure 18:
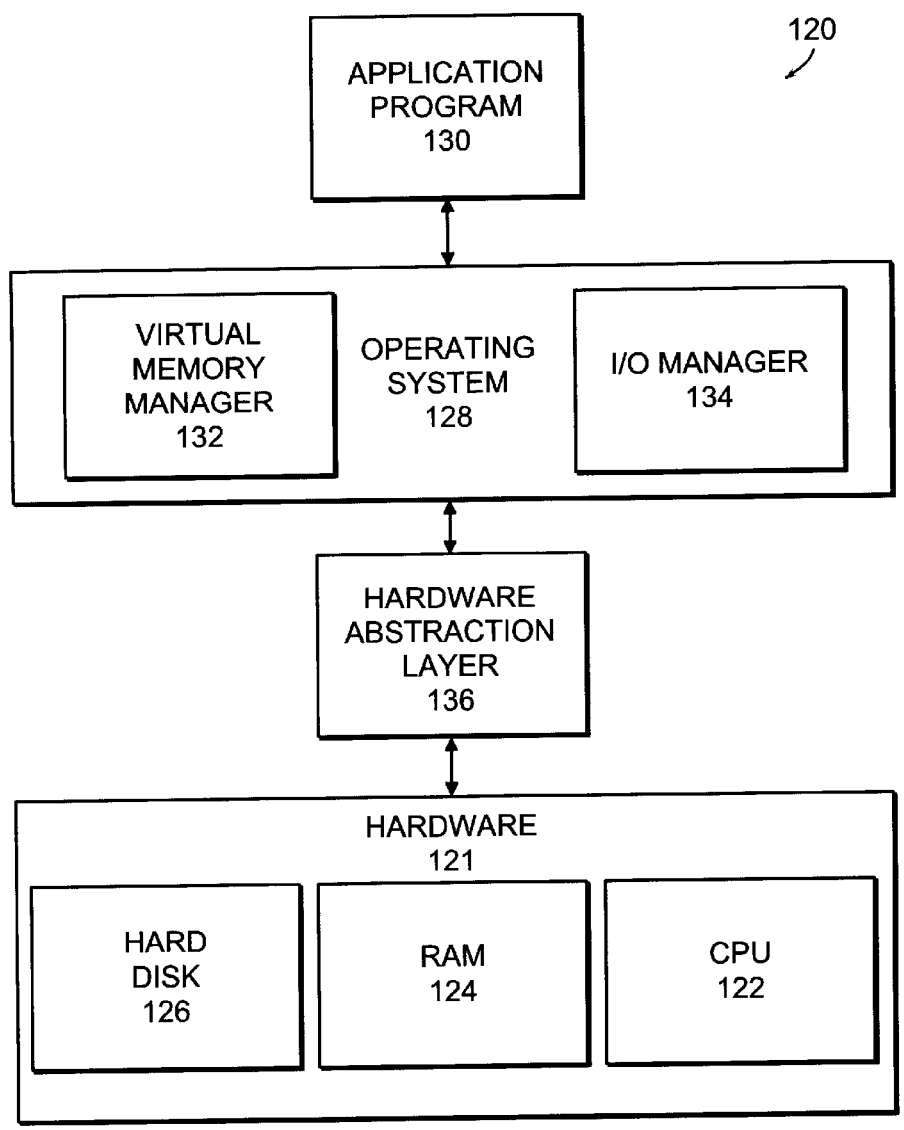
FIG. 18 illustrates the system architecture for an exemplary computer system on which the disclosed methods and apparatus for automatic consistency checking of computer programs can be implemented.

FIG. 18 illustrates the system architecture for an exemplary computer system 120, such as an IBM THINKPAD 701® computer (distributed by International Business Machines of Armonk, New York), on which the disclosed system for an automatic consistency checker for computer programs is used. The exemplary computer system of FIG. 120 is discussed for descriptive purposes only, however, and should not be considered a limitation of the invention. Although the description below may refer to terms commonly used in describing particular computer systems, the described concepts apply equally to other computer systems, including systems having architectures that are dissimilar to that shown in FIG. 18.

The system 120 includes hardware 121 comprising, among other things, a central processing unit 122 for processing computer instructions, random access memory ("RAM 124") for high-speed, volatile data storage, and a hard disk 126 for non-volatile data storage. The system 120 also includes a virtual memory operating system 128 for both controlling system processes, and interfacing between an application program 130 and hardware 121. Operating system 128 includes a virtual memory manager 132 for accessing RAM 124, and an input/output manager ("I/O manager 134") for controlling input to and output from system 120. RAM 124 may be accessed by virtual memory manager 132 only and thus, is not directly accessible by any other part of system 120. In a preferred embodiment of the invention, operating system 128 is the Microsoft Windows NT™ operating system, Version 4.0 ("Microsoft Windows NT™") distributed by Microsoft Corp. Although not necessary in many operating systems, a hardware abstraction layer 136 ("HAL") also may be included in system 120 to interface operating system 128 with different hardware architectures. It should be noted that although the invention is described in connection with the Windows NT™ operating system, its principles apply to other virtual memory operation systems.

In an alternative embodiment, the invention may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with The exemplary computer system of FIG. 120 is discussed for descriptive purposes only, however, and should not be considered a limitation of the invention. Although the description below may refer to terms commonly used in describing particular computer systems, the described concepts apply equally to other computer systems, including systems having architectures that are dissimilar to that shown in FIG. 18.

The system 120 includes hardware 121 comprising, among other things, a central processing unit 122 for processing computer instructions, random access memory ("RAM 124") for high-speed, volatile data storage, and a hard disk 126 for non-volatile data storage. The system 120 also includes a virtual memory operating system 128 for both controlling system processes, and interfacing between an application program 130 and hardware 121. Operating system 128 includes a virtual memory manager 132 for accessing RAM 124, and an input/output manager ("I/O manager 134") for controlling input to and output from system 120. RAM 124 may be accessed by virtual memory manager 132 only and thus, is not directly accessible by any other part of system 120. In a preferred embodiment of the invention, operating system 128 is the Microsoft Windows NT™ operating system, Version 4.0 ("Microsoft Windows NT™") distributed by Microsoft Corp. Although not necessary in many operating systems, a hardware abstraction layer 136 ("HAL") also may be included in system 120 to interface operating system 128 with different hardware architectures. It should be noted that although the invention is described in connection with the Windows NT™ operating system, its principles apply to other virtual memory operation systems.

In an alternative embodiment, the invention may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog-communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable media with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

What is claimed is:

1. An apparatus for identifying inconsistencies in a software program the apparatus comprising:
   a. a block registrar module for identifying a series program blocks constituting a segment, the segment being at least a part of the program, each block having at least one point corresponding to at least one of entry and exit;
   b. a routing map module coupled to the block registrar module for sequencing the blocks along a program execution path in which the program executes in a downstream direction;
   c. a decision expert module coupled to the routing map module for determining which execution path to follow when execution path junctions occur; and
   d. a data transfer expert coupled to the decision expert module for defining and associating a block representative with respect to each block, the block representative (i) allocating computer memory for data elements that are needed for the associated block to execute, (ii) assigning value to any data element required by the associated block to have a value; (iii) calling the associated block for execution, (iv) receiving return of control after execution of the block, and (v) passing control based on available data.

2. An apparatus according to claim 1 further comprising:
   e. a consistency checker module coupled to the data transfer module, the consistency checker module, for each given block representative, identifies all data elements, from upstream block representatives, on which the data elements of the given block representative are logically dependent, any upstream block representatives containing such data elements being ancestor block representatives.

3. An apparatus according to claim 2 further comprising:
   f. a code generator module for generating executable code based on the blocks after the blocks are found to be consistent.

4. An apparatus according to claim 2, wherein the block representative includes a virtual page, the virtual page being a virtual entry page when associated with an entry point and performing functions (i), (ii), and (iii) of the data transfer module of the block representative, and being a virtual exit page when associated with an exit point and performing functions (iv) and (v) of the data transfer module of the block representative;
where an upstream virtual page is an ancestor page if it contains data elements from which data elements of a given virtual page are logically dependent.

5. An apparatus according to claim 4, wherein any given virtual entry page may lie in any number of execution paths and each data element of the given entry page may be expressed as a function of one or more data elements occurring in one or more ancestor pages along any of the execution paths.

6. An apparatus according to claim 5, wherein the software program includes a loop, so that in execution a given point is passed more than once, and wherein the data transfer expert module indexes a page according to the number of times that it appears in execution of the program, and the consistency checker module reports a page of a first index as upstream of the same page of an index greater than the first index.

7. An apparatus according to claim 6, wherein for a given entry page in an execution path after at least one occurrence of the loop, each data element of the given entry page is logically dependent, if at all, on one or more data elements occurring only in a predetermined number of ancestor pages in previous iterations of the loop.

8. An apparatus according to claim 4, wherein the consistency checker module further includes:
   a modification checker component, which, in a case wherein a block is modified in such a way as to require a modification in a virtual exit page associated with the block, identifies all data elements, in downstream entry pages, that are affected by the modification.

9. An apparatus according to claim 4, wherein the consistency checker module further includes:
   a modification checker component, which, in a case wherein a block is modified in such a way as to require a modification in a virtual entry page associated with the block, examines upstream pages to identify any data element, in the virtual entry page, that lacks a logical dependency on one or more data elements occurring in one or more ancestor pages.

10. An apparatus according to claim 4, wherein the consistency checker module further includes:
    a modification checker component, which, in a case wherein a block is subject to a move from its current position within the segment to a new position within the segment, identifies all downstream entry pages that are affected by the move.

11. An apparatus according to claim 4 wherein the consistency checker module further includes:
    a modification checker component, which, in a case wherein a block is subject to a move from its current position within the segment to a new position within the segment, identifies all downstream entry pages that are affected by the move and to check all upstream exit pages to identify whether as a result of the move there are any data elements associated with the virtual entry page for the block that are not available from an upstream exit page so that logical consistency may be maintained.

12. An apparatus according to claim 5, wherein the consistency checker module further includes:
a modification checker component, which, in a case wherein a block is subject to a move from its current execution path within the segment to a new execution path within the segment, identifies all downstream entry pages in the new execution path that are affected by the move and to check all upstream exit pages in the new execution path to identify whether as a result of the move there are any data elements associated with the virtual entry page for the block that are not available from an upstream exit page so that logical consistency may be maintained.

13. An apparatus according to claim 5, wherein the consistency checker module further includes:
a modification checker component, which, in a case wherein a block is subject to a move from its current execution path within the segment to a new execution path within the segment, identifies all downstream entry pages that are affected in the current execution path by the move to the new execution path and to check all upstream exit pages in the current execution path to identify whether as a result of the move to the new execution path there are any data elements associated with the virtual entry page for the block that are not available from an upstream exit page so that logical consistency may be maintained.

14. An apparatus according to claim 5, wherein a function defines the dependency of a given data element of the given entry page on one or more data elements occurring in one or more ancestor pages, wherein the consistency checker module further includes:
a formula consistency component, which (i) assigns a sense to a selected set of data elements occurring in virtual pages of the segment, (ii) assigns a sense to a selected set of functions, which affect the selected set of data elements, that are implemented in the segment, and (iii) determines whether the function, applied to the one or more data elements occurring in one or more ancestor pages, has a sense that is compatible with the sense of the data element of the given entry page or a superset of the sense of the data element of the given entry page.

15. An apparatus according to claim 14, wherein the formula consistency component assigns the same sense to data elements that are represented by an identical data structure, uses with respect to such data elements an identical set of data validation rules.

16. An apparatus according to claim 14, wherein the formula consistency component arranges the senses of the one or more data elements into hierarchical levels so that data elements having the same sense level or a higher sense level are compatible and higher sense levels are a superset of lower sense levels.

* * * * *